United States Patent
Huang et al.

(10) Patent No.: US 11,308,307 B2
(45) Date of Patent: Apr. 19, 2022

(54) FINGERPRINT SENSING MODULE

(71) Applicant: Au Optronics Corporation, Hsinchu (TW)

(72) Inventors: Yu-Han Huang, Hsinchu (TW); Chao-Chien Chiu, Hsinchu (TW); Shih-Hua Lu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/359,630

(22) Filed: Jun. 27, 2021

(65) Prior Publication Data

US 2022/0050989 A1 Feb. 17, 2022

Related U.S. Application Data

(60) Provisional application No. 63/066,391, filed on Aug. 17, 2020.

(30) Foreign Application Priority Data

Mar. 22, 2021 (TW) ................................ 110110148

(51) Int. Cl.
*G06K 9/00* (2022.01)

(52) U.S. Cl.
CPC ....... *G06K 9/0004* (2013.01); *G06K 9/00046* (2013.01)

(58) Field of Classification Search
None
See application file for complete search history.

(56) References Cited

U.S. PATENT DOCUMENTS

| | | | |
|---|---|---|---|
| 7,259,915 B2 | 8/2007 | Kwon et al. | |
| 8,077,230 B2 | 12/2011 | Liu | |
| 9,253,456 B2 | 2/2016 | Ogita et al. | |
| 9,263,495 B2 | 2/2016 | Kim et al. | |
| 2005/0264863 A1 | 12/2005 | Kwon et al. | |
| 2009/0127441 A1 | 5/2009 | Hwang | |
| 2020/0293740 A1* | 9/2020 | Yao | H01L 27/14621 |
| 2020/0301187 A1* | 9/2020 | Lin | G02F 1/13318 |
| 2020/0380237 A1* | 12/2020 | Nilsson | G06K 9/0004 |
| 2020/0401782 A1* | 12/2020 | Cheng | G06K 9/00114 |
| 2021/0133423 A1 | 5/2021 | Zhang et al. | |
| 2021/0225948 A1* | 7/2021 | Liu | H01L 27/3272 |

FOREIGN PATENT DOCUMENTS

| | | |
|---|---|---|
| CN | 1704773 | 12/2005 |
| CN | 111507229 | 8/2020 |
| TW | M595331 | 5/2020 |

* cited by examiner

Primary Examiner — Nicholas J Lee
(74) Attorney, Agent, or Firm — JCIPRNET

(57) ABSTRACT

A fingerprint sensing module including a substrate, a plurality of photosensitive devices, a collimation structure layer, a light-shielding layer, an interposer and a plurality of micro lenses is provided. The photosensitive devices are disposed on the substrate. The collimation structure layer is disposed on the photosensitive devices. The light-shielding layer is disposed on the collimation structure layer and has a surface and a plurality of first openings recessed from the surface. The first openings respectively overlap the photosensitive devices. The interposer is disposed on the collimation structure layer and positioned in a part of the first openings of the light-shielding layer. The micro lenses are disposed on the interposer and respectively overlap the first openings.

17 Claims, 5 Drawing Sheets

FINGERPRINT SENSING MODULE

CROSS-REFERENCE TO RELATED APPLICATION

This application claims the priority benefit of U.S. provisional application Ser. No. 63/066,391, filed on Aug. 17, 2020, and Taiwan application serial no. 110110148, filed on Mar. 22, 2021. The entirety of each of the above-mentioned patent applications is hereby incorporated by reference herein and made a part of this specification.

BACKGROUND

Technical Field

The disclosure relates to an optical sensing module, and more particularly to a fingerprint sensing module.

Description of Related Art

In order to increase the screen-to-body ratio of the display to achieve a narrow border design, under-screen fingerprint sensing technology is now commonly adopted as a trend for development. Briefly speaking, the under-screen fingerprint sensing technology is to dispose the fingerprint sensing module under the display panel of the electronic device. After the electronic device detects that s user touches the display screen, the electronic device controls the display panel to emit light to illuminate the surface of the user's finger. The sensing light will be reflected by the user's finger (diffusely) into the fingerprint sensing module under the display panel, and the reflected light will be converged on the photosensitive element through a plurality of micro lenses and a collimation structure to convert the reflected light into a digital image signal. Then the user's fingerprint image can be obtained.

Since the gaps between these micro lenses are large, in order to avoid this type of fingerprint sensing module from easily receiving the stray light incident at a large angle, resulting in blurred fingerprint images, a light-shielding layer can be arranged between these micro lenses. However, the adhesion of these micro lenses on the light-shielding layer is likely to decrease due to poor material compatibility, which causes the surface of the light-shielding layer of the micro lenses to easily peel off, which in turn affects the overall production yield.

SUMMARY

The disclosure provides a fingerprint sensing module with anti-counterfeiting function, which has less manufacturing processes.

The disclosure provides a fingerprint sensing module with high production yield.

In an embodiment of the disclosure, a fingerprint sensing module includes a substrate, a plurality of photosensitive devices, a collimation structure layer, a light-shielding layer, an interposer, and a plurality of micro lenses. The photosensitive devices are disposed on the substrate. The collimation structure layer is disposed on the photosensitive devices. The light-shielding layer is disposed on the collimation structure layer and has a surface and a plurality of first openings recessed from the surface. The first openings respectively overlap the photosensitive devices. The interposer is disposed on the collimation structure layer and positioned in a part of the first openings of the light-shielding layer. The plurality of micro lenses are disposed on the interposer and respectively overlap the first openings.

In an embodiment of the disclosure, the fingerprint sensing module includes a substrate, a plurality of photosensitive devices, a collimation structure layer, a light-shielding layer, an interposer, and a plurality of micro lenses. These photosensitive devices are arranged on the substrate. The collimation structure layer is arranged on these photosensitive devices. The light-shielding layer is arranged on the collimation structure layer and has a surface and a plurality of first openings recessed from the surface. The first openings respectively overlap the photosensitive devices. The interposer is arranged on the collimation structure layer and covers the surface of the light-shielding layer. These micro lenses are arranged on the interposer and overlap the first openings and a part of the interposer.

Based on the above, in an embodiment of the disclosure, in the fingerprint sensing module, the light-shielding layer has a plurality of first openings overlapping a plurality of photosensitive devices. By arranging interposers in part of the first openings, it is possible to further increase the difference in optical characteristics (such as spectral distribution) of multiple light after the light pass through these first openings and are transmitted to the corresponding photosensitive device. Accordingly, the fingerprint sensing module can be provided with an anti-counterfeiting function, and the manufacturing processes of the fingerprint sensing module are less than that of a conventional color-resistance anti-counterfeiting structure. In the fingerprint sensing module in another embodiment of the disclosure, the light-shielding layer is provided with an interposer on the surfaces of the plurality of first openings. By extending the micro lenses arranged in an overlapped manner in the first openings to the surface of the light-shielding layer and contacting the interposer, it is possible to effectively reduce the risk of peeling off for these micro lenses, thereby improving the production yield of fingerprint sensing modules. In addition, the flexibility of material selection for the light-shielding layer and micro lenses can also be increased.

DESCRIPTION OF THE EMBODIMENTS

Figure 1:
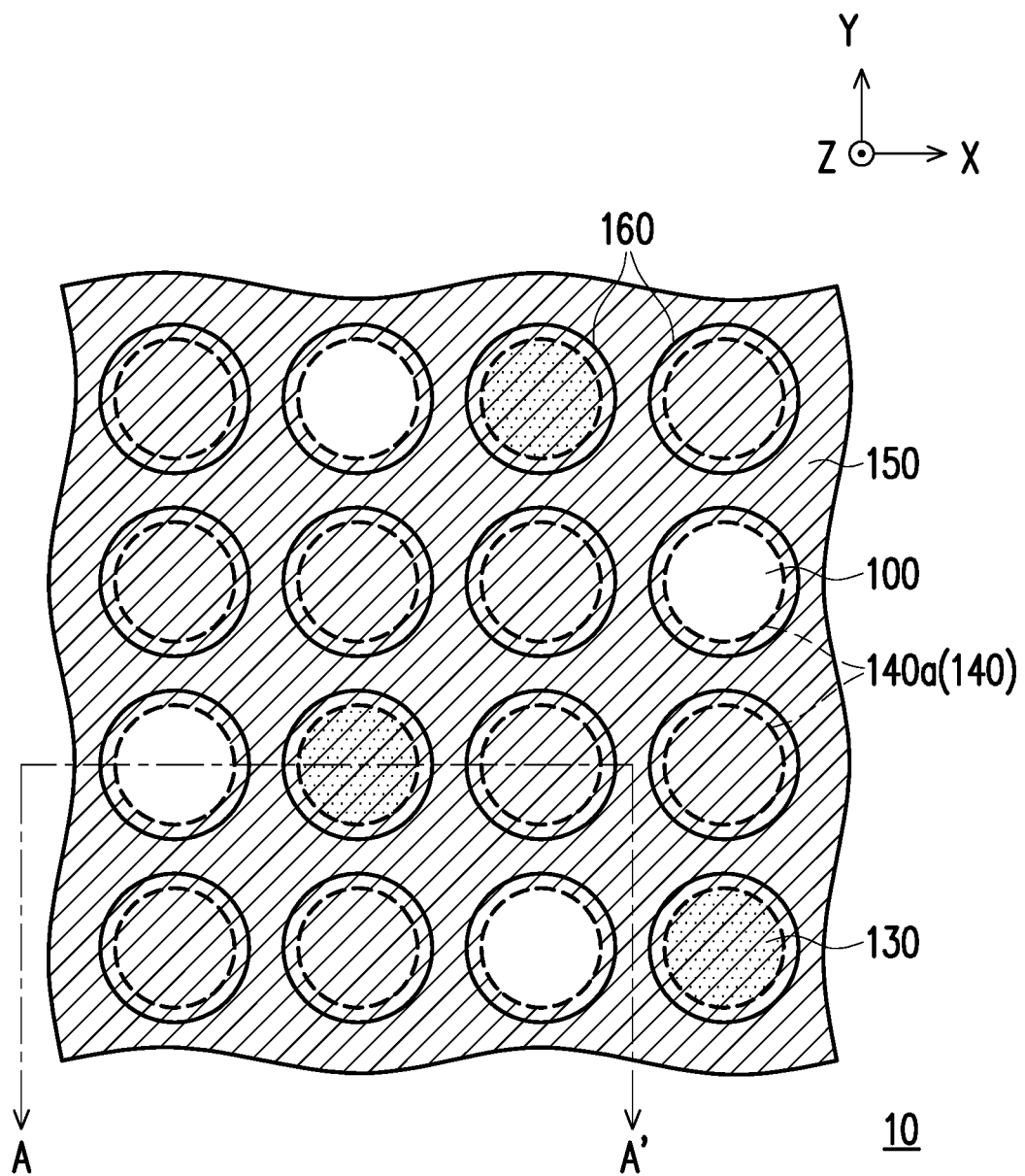
FIG. 1 is a schematic top view of a fingerprint sensing module according to an embodiment of the disclosure.

The terms used herein, including "about", "approximately", "essentially", or "substantially" involves the stated value and the average value within the acceptable deviation range of the specific value determined by a person of ordinary skill in the art. In consideration the measurement in question and the specific number of errors associated with the measurement (i.e., the limitations of the measurement system), for example, "about" can be used to describe a value within one or more standard deviations of the stated value, or, for instance, within ±30%, ±20%, ±15%, ±10%, and ±5%. Furthermore, the "about", "approximately", "essentially", or "substantially" used herein can selectively refer to a more acceptable deviation range or standard deviation based on measurement properties, cutting properties, or other properties rather than applying one standard deviation to all properties.

In the drawings, the thickness of layers, films, panels, regions, etc., are exaggerated for clarity. It should be understood that when an element such as a layer, film, region, or substrate is referred to as being "on" or "connected" to another element, it can be directly on or connected to the other element, or an intermediate elements may also be present. In contrast, when an element is referred to as being "directly on" or "directly connected to" another element, there are no intermediate elements. As used herein, "connected" can refer to physical and/or electrical connection. Furthermore, "electrical connection" can mean that there are other elements between two elements.

Reference will now be made in detail to the exemplary embodiments of the present disclosure, and examples of the exemplary embodiments are illustrated in the accompanying drawings. Whenever possible, the same reference symbols used in the drawings and descriptions indicate the same or similar parts.

Figure 2:
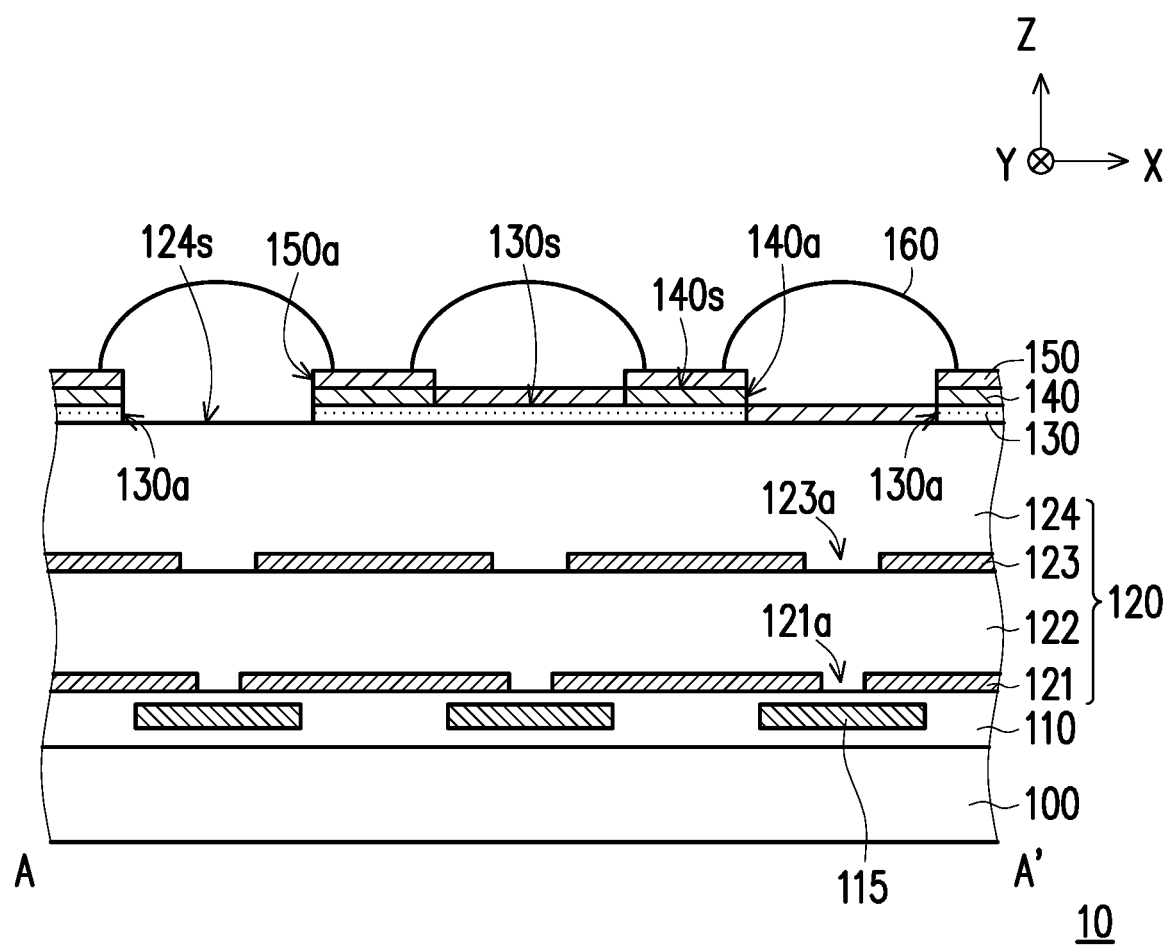
FIG. 2 is a schematic cross-sectional view of the fingerprint sensing module of FIG. 1.
Figure 3:
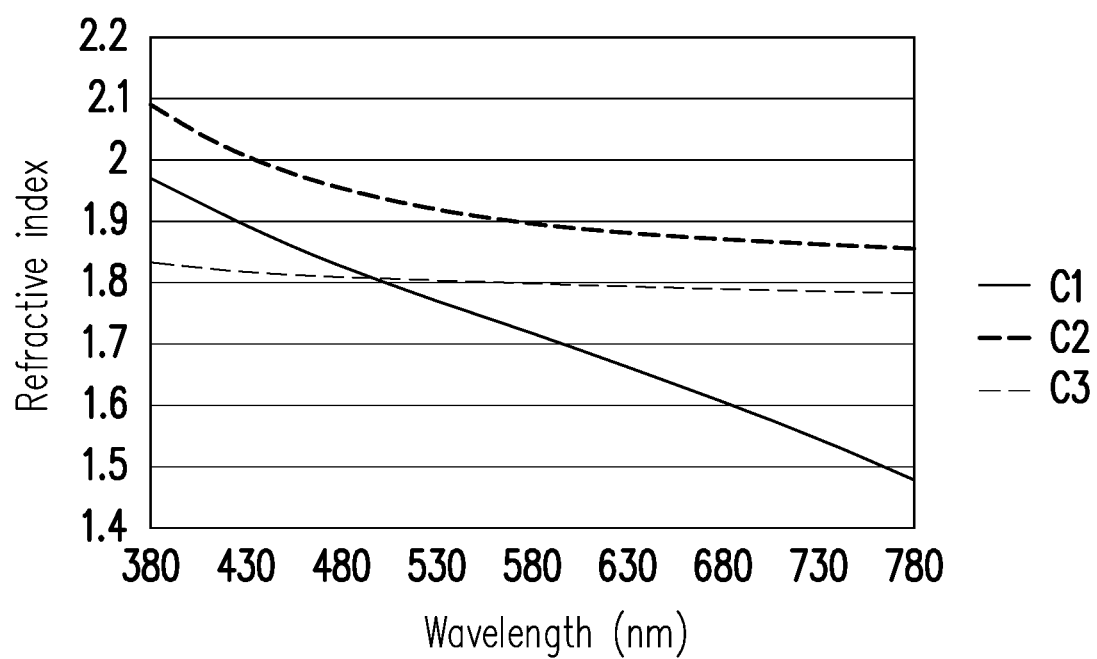
FIG. 3 is a curve diagram showing the refractive index of the interposer and the auxiliary layer of FIG. 1 with respect to wavelength.

FIG. 1 is a schematic top view of a fingerprint sensing module according to an embodiment of the disclosure. FIG. 2 is a schematic cross-sectional view of the fingerprint sensing module of FIG. 1. FIG. 2 corresponds to the section line A-A' in FIG. 1. FIG. 3 is a curve diagram showing the refractive index of the interposer and the auxiliary layer of FIG. 1 with respect to wavelength. It should be noted that, for clarity and convenience of description, FIG. 1 only shows the substrate 100, the auxiliary layer 130, the opening 140a of the light-shielding layer 140, the interposer 150, and a plurality of micro lenses 160 in FIG. 2.

Referring to FIG. 1 and FIG. 2, the fingerprint sensing module 10 includes a substrate 100, a photosensitive device layer 110, a collimation structure layer 120, an auxiliary layer 130, a light-shielding layer 140, an interposer 150, and a plurality of micro lenses 160. The photosensitive device layer 110 is provided on the substrate 100. For example, the photosensitive device layer 110 may include a plurality of photosensitive devices 115 and a plurality of control elements (not shown), and the electrical connection relationship between the control elements and the photosensitive device 115 may be one-to-one or one-to-many. The control elements here are, for example, thin film transistors (TFT), and these control elements are adaptable for sequentially transmitting the electrical signals from these photosensitive devices 115 to a signal processing circuit (not shown) through a plurality of signal lines (not shown) in sequence, so as to identify the fingerprint image, but the disclosure is not limited thereto.

The collimation structure layer 120 is disposed on the photosensitive device layer 110, and includes at least one light-shielding pattern layer. In this embodiment, the collimation structure layer 120 may optionally include two light-shielding pattern layers, which are a first light-shielding pattern layer 121 and a second light-shielding pattern layer 123, respectively. The light-shielding pattern layers are all disposed between the plurality of micro lenses 160 and the photosensitive device layer 110, and the second light-shielding pattern layer 123 is disposed between the plurality of micro lenses 160 and the first light-shielding pattern layer 121. The first light-shielding pattern layer 121 has a plurality of first openings 121a, and the plurality of first openings 121a respectively overlap the plurality of micro lenses 160 in the stacking direction (for example, direction Z) of the two light-shielding pattern layers. The second light-shielding pattern layer 123 has a plurality of second openings 123a, and the plurality of second openings 123a respectively overlap the plurality of first openings 121a (or a plurality of micro lenses 160) in the direction Z.

In this embodiment, a plurality of micro lenses 160 are disposed on the collimation structure layer 120, and each of the plurality of micro lenses 160 corresponds to a corresponding first opening 121a, a corresponding second opening 123a, and a corresponding photosensitive device 115 of the photosensitive device layer 110. However, the disclosure is not limited thereto. According to other embodiments, each of the micro lenses 160 may also correspond to at least two photosensitive devices 115 of the photosensitive device layer 110. In order to achieve the effect of light collimation, a flat layer 122 is provided between the first light-shielding pattern layer 121 and the second light-shielding pattern layer 123, and a flat layer 124 can further be optionally provided between the second light-shielding pattern layer 123 and the plurality of micro lenses 160, but the disclosure is not limited thereto. In this embodiment, a plurality of micro lenses 160 may be arranged in an array. For example, these micro lenses 160 may be arranged in multiple columns and multiple rows in the direction X and the direction Y, but the disclosure is not limited thereto. In other embodiments, the arrangement of the plurality of micro lenses 160 can be adjusted according to the actual product design, for example, they can also be arranged in the shape of a honeycomb or with unequal spacing.

Since the gaps between these micro lenses 160 are large, in order to avoid the fingerprint sensing module 10 from easily receiving the stray light incident at a large angle, resulting in blurred fingerprint images, a light-shielding layer 140 is arranged between the plurality of micro lenses 160 and the collimation structure layer 120. The light-shielding layer 140 has a surface 140s and a plurality of openings 140a recessed from the surface 140s, and a plurality of micro lenses 160 (or a plurality of photosensitive devices 115) respectively overlap the openings 140a in the direction Z. In this embodiment, the material of the light-shielding layer 140 is, for example, molybdenum metal, and the material of the flat layer 124 of the collimation structure layer 120 is, for example, an organic photoresist material. In order to stabilize the connection relationship between the light-shielding layer 140 and the collimation structure layer 120, an auxiliary layer 130 is provided between the light-shielding layer 140 and the flat layer 124, and the material of the auxiliary layer 130 is, for example, silicon nitride (SiNx).

On the other hand, in this embodiment, the material of the micro lenses 160 is, for example, an organic photoresist material. In order to reduce the risk of the plurality of micro lenses 160 peeling off on the light-shielding layer 140 and the auxiliary layer 130, an interposer 150 is provided between the plurality of micro lenses 160 and the light-shielding layer 140. In other words, the arrangement of the interposer 150 can stabilize the connection relationship between the plurality of micro lenses 160 and the collimation structure layer 120. In this embodiment, the material of the interposer 150 is, for example, indium tin oxide (ITO), but the disclosure is not limited thereto. In other embodiments, the material of the interposer 150 may also be indium zinc oxide (IZO) or other suitable transparent conductive materials.

In this embodiment, the interposer 150 can also optionally cover the surface 140s of the light-shielding layer 140. That is, the region between the plurality of openings 140 a (or the plurality of micro lenses 160) of the light-shielding layer 140 may also be provided with an interposer 150. Through the arrangement that the plurality of micro lenses 160 partially overlap the surface 140s of the light-shielding layer 140 in the direction Z, and directly contact the part of the interposer 150 covering the surface 140s of the light-shielding layer 140, it is possible to further reduce the risk of micro lenses 160 peeling off, thereby improving the production yield of the fingerprint sensing module 10.

In particular, in addition to the above-mentioned effects, the configuration of the interposer 150 can further enable the fingerprint sensing module 10 to have an anti-counterfeiting function. For example, the interposer 150 can be optionally disposed in a part of the openings 140a of the light-shielding layer 140, and has a plurality of openings 150a overlapping the other part of the openings 140a in the direction Z, so that the spectral distribution of light after passing through the openings 140a where the interposer 150 is provided is different from the spectral distribution of light after passing through the openings 140a where the interposer 150 is not provided.

In this embodiment, the auxiliary layer 130 may optionally have a plurality of openings 130a overlapping part of the openings 140a in the direction Z, and a part of the interposer 150 may further be located in part of the openings 130a of the auxiliary layer 130. Therefore, it is possible to further increase the difference in the spectral distribution of light passing through the plurality of openings 140a of the light-shielding layer 140 and being transmitted to the photosensitive device layer 110. In order to achieve the difference in spectral distribution as mentioned above, the refractive index of the interposer 150 and the refractive index of the auxiliary layer 130 in this embodiment need to have a certain change rate in the visible light band. For example: the curve C1 in FIG. 3 shows the refractive index change of the interposer 150 made of ITO material in the visible light band, the curve C2 in FIG. 3 shows the refractive index change of the interposer 150 made of IZO material in the visible light band, and the curve C3 in FIG. 3 shows the refractive index change of the auxiliary layer 130 made of silicon nitride in the visible light band.

For example, the auxiliary layer 130 and the interposer 150 both have openings in the region where the micro lenses 160 are provided on the left side of FIG. 2, but none of them have openings in the region where the micro lenses 160 are provided in the middle of FIG. 2. In the region where the micro lenses 160 are provided on the right side of FIG. 2, only the auxiliary layer 130 has the openings 130a, and the openings 130a of the auxiliary layer 130 are provided with interposers 150 therein. Therefore, the light incident on the three micro lenses 160 have different spectral distributions when incident on the collimation structure layer 120. From another point of view, the design of the opening for the interposer 150 and the auxiliary layer 130 can also simplify the manufacturing process of the fingerprint sensing module 10 with anti-counterfeiting function.

In detail, the openings 130a of the auxiliary layer 130 expose the surface 124s of the flat layer 124 of the collimation structure layer 120, and the micro lenses 160 on the left side of FIG. 2 can directly contact this surface 124s of the flat layer 124. Since the materials of the micro lenses 160 and the flat layer 124 of the present embodiment can be the same optionally, allowing the micro lenses 160 to directly contact the flat layer 124 helps to increase the adhesion of the micro lenses 160, but the disclosure is not limited thereto. On the other hand, the auxiliary layer 130 further has a surface 130s exposed by the opening 140a of the light-shielding layer 140, a part of the interposer 150 further covers this surface 130s of the auxiliary layer 130, and the micro lenses 160 in the middle of FIG. 2 directly contact the part of the interposer 150 located in the opening 140a of the light-shielding layer 140. The other part of the interposer 150 further covers the surface 124s of the flat layer 124 exposed by the openings 130a of the auxiliary layer 130, and the micro lenses 160 on the right side of FIG. 2 directly contact this other part of the interposer 150 located in the openings 130a of the auxiliary layer 130. Although the layer structures in the region where the micro lenses 160 are provided are not the same, the arrangement of the interposer 150 can prevent the micro lenses 160 from directly contacting the auxiliary layer 130 and the light-shielding layer 140 and avoid the increase of risk of peeling from the surface of these layers. From another point of view, the arrangement of the interposer 150 can further increase the flexibility in the selection of materials for the auxiliary layer 130, the light-shielding layer 140 and the micro lenses 160.

Hereinafter, other embodiments will be listed as follows to describe the present disclosure in detail, in which the same components will be marked with the same reference numerals, and the description of the same technical content will be omitted. The omitted parts can be derived from the foregoing embodiments, so no further description will be incorporated herein.

Figure 4:
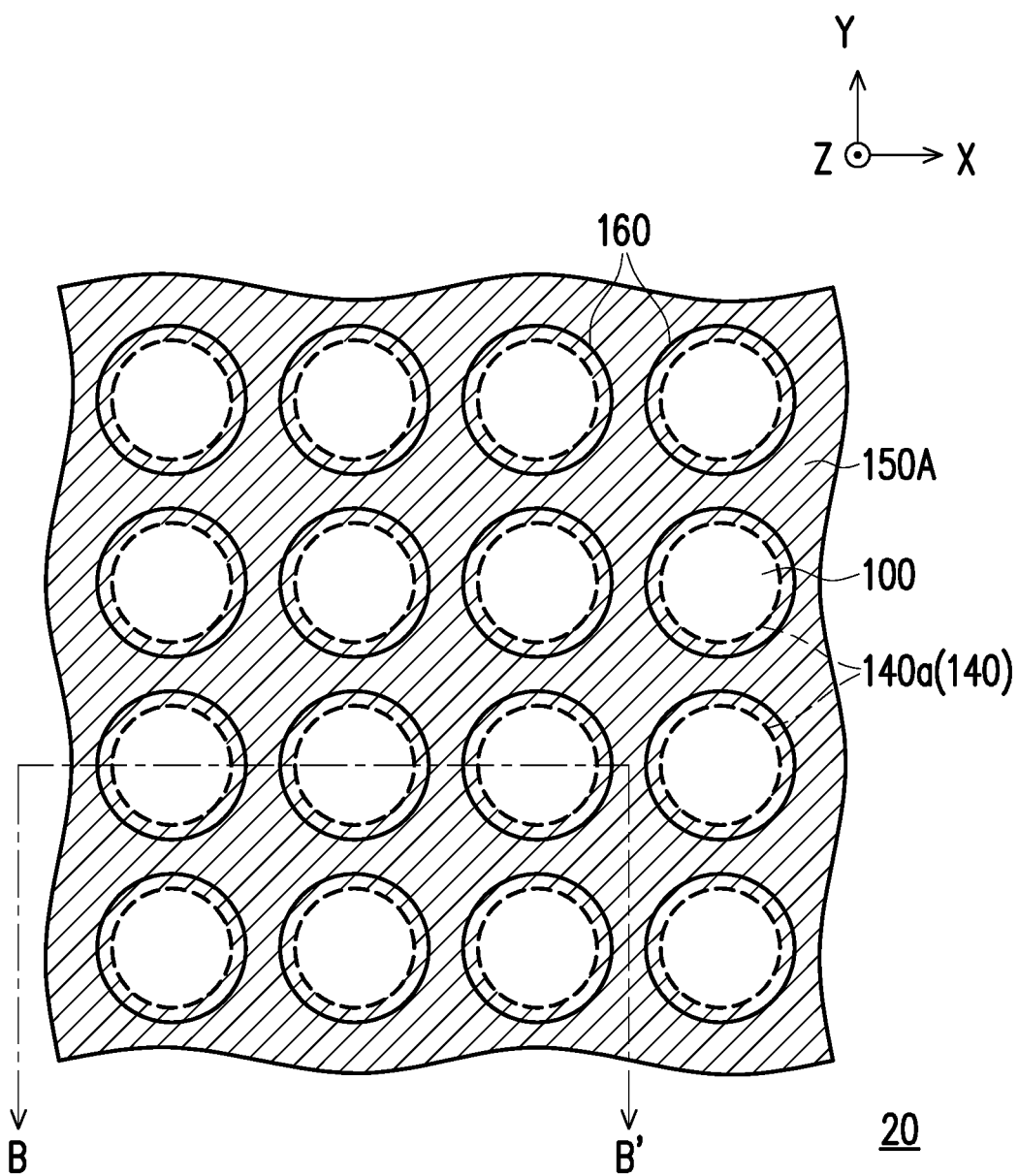
FIG. 4 is a schematic top view of a fingerprint sensing module according to another embodiment of the disclosure.
Figure 5:
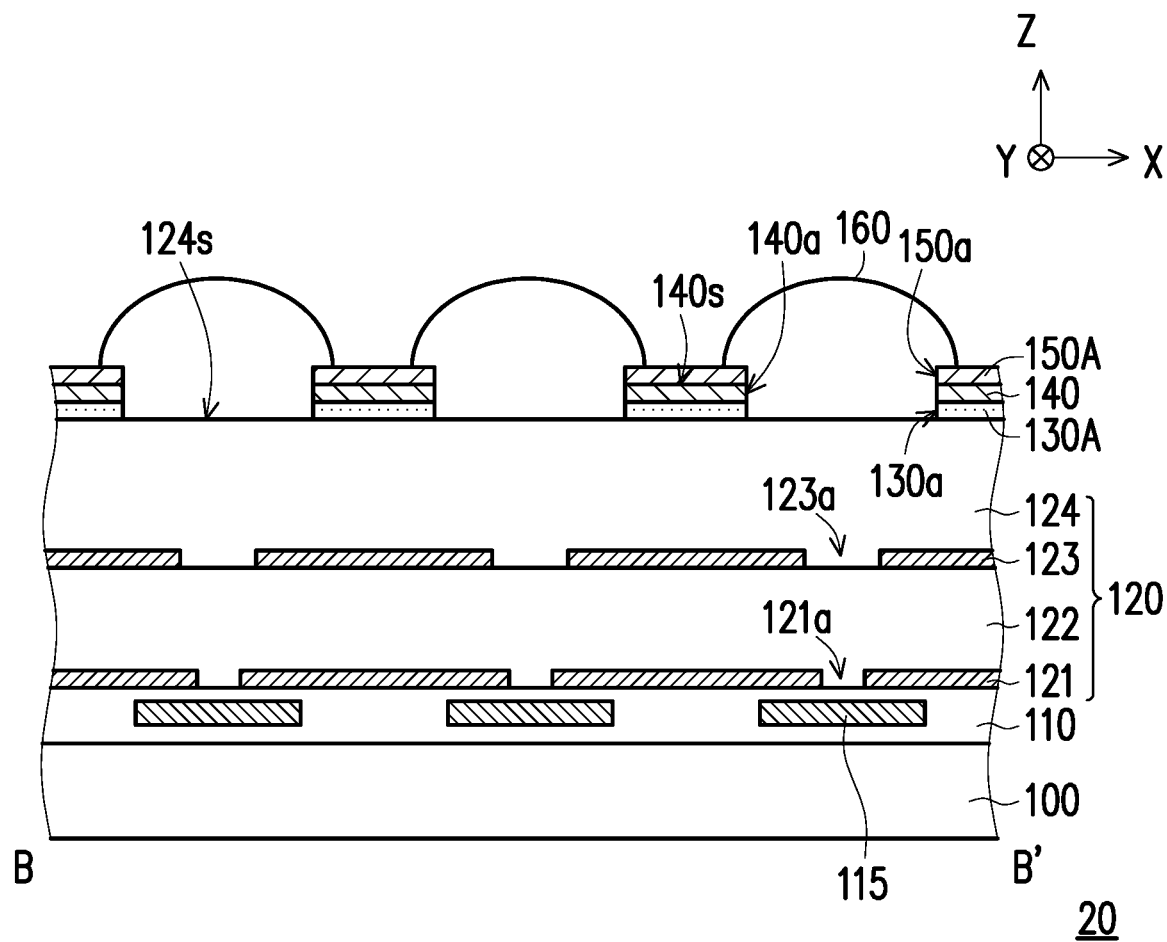
FIG. 5 is a schematic cross-sectional view of the fingerprint sensing module of FIG. 4.

FIG. 4 is a schematic top view of a fingerprint sensing module according to another embodiment of the disclosure. FIG. 5 is a schematic cross-sectional view of the fingerprint sensing module of FIG. 4. FIG. 5 corresponds to the section line B-B' in FIG. 4. It should be noted that, for clarity and convenience of description, FIG. 4 only shows the substrate 100, the opening 140a of the light-shielding layer 140, the interposer 150A, and a plurality of micro lenses 160 in FIG. 5.

Please refer to FIG. 4 and FIG. 5, the difference between the fingerprint sensing module 20 of this embodiment and the fingerprint sensing module 10 of FIG. 1 is that the configuration of the interposer and the configuration of the auxiliary layer are different. In this embodiment, the interposer 150A of the fingerprint sensing module 20 does not overlap the plurality of openings 140a of the light-shielding layer 140 in the direction Z. More specifically, the interposer 150A has a plurality of openings 150a, and the openings 150a respectively overlap the openings 140a of the light-shielding layer 140 in the direction Z. Similarly, the auxiliary layer 130A has a plurality of openings 130a, and the openings 130a respectively overlap the openings 140a of the light-shielding layer 140 in the direction Z. That is, the auxiliary layer 130A does not overlap the openings 140a of the light-shielding layer 140 in the direction Z. In other words, the fingerprint sensing module 20 in this embodiment does not have the anti-counterfeiting function of the fingerprint sensing module 10 in FIG. 2.

It should be noted that all the micro lenses 160 of this embodiment respectively penetrate the openings 150a of the interposer 150A, the openings 140a of the light-shielding layer 140, and the openings 130a of the auxiliary layer 130A, and directly contact the surface 124s of the flat layer 124 of the collimation structure layer 120. For example, in this embodiment, the openings 150a of the interposer 150A, the openings 140a of the light-shielding layer 140, and the openings 130a of the auxiliary layer 130A can be optionally aligned with each other in the direction Z. More specifically, the openings of the interposer 150A, the light-shielding layer 140 and the auxiliary layer 130A can be formed in the same etching process.

Since the material of the micro lenses 160 and the flat layer 124 of this embodiment can be the same optionally (for example, both are organic photoresist materials), the micro lenses 160 are made to avoid contacting the auxiliary layer 130A and the light-shielding layer 140 as much as possible and directly contact the flat layer 124, thereby effectively reduce the risk of the micro lenses 160 peeling off.

On the other hand, by arranging the plurality of micro lenses 160 to partially overlap the surface 140s of the light-shielding layer 140 in the direction Z, and directly contact the part of the interposer 150 covering the surface 140s of the light-shielding layer 140, it is possible to further reduce the risk for the micro lenses 160 to peel off, thereby improving the production yield of the fingerprint sensing module 20.

In summary, in the fingerprint sensing module of an embodiment of the disclosure, the light-shielding layer has a plurality of first openings overlapping a plurality of photosensitive devices. By arranging interposers in part of the first openings, it is possible to further increase the difference in optical characteristics (such as spectral distribution) of multiple light after the light pass through these first openings and are transmitted to the corresponding photosensitive device. Accordingly, the fingerprint sensing module can be provided with an anti-counterfeiting function, and the manufacturing processes of the fingerprint sensing module are less than that of a conventional color-resistance anti-counterfeiting structure. In the fingerprint sensing module in another embodiment of the disclosure, the light-shielding layer is provided with an interposer on the surfaces of the plurality of first openings. By extending the micro lenses arranged in an overlapped manner in the first openings to the surface of the light-shielding layer and contacting the interposer, it is possible to effectively reduce the risk of peeling off for these micro lenses, thereby improving the production yield of fingerprint sensing modules. In addition, the flexibility of material selection for the light-shielding layer and micro lenses can also be increased.

What is claimed is:

1. A fingerprint sensing module, comprising:
   a substrate;
   a plurality of photosensitive devices, disposed on the substrate;
   a collimation structure layer, disposed on the plurality of photosensitive devices;
   a light-shielding layer, disposed on the collimation structure layer, wherein the light-shielding layer has a surface and a plurality of first openings recessed from the surface, the plurality of first openings respectively overlap the plurality of photosensitive devices;
   an interposer, disposed on the collimation structure layer and located in a part of the plurality of first openings of the light-shielding layer; and
   a plurality of micro lenses, disposed on the interposer and respectively overlap the plurality of first openings.

2. The fingerprint sensing module according to claim 1, further comprising:
   an auxiliary layer, disposed between the light-shielding layer and the collimation structure layer, wherein the auxiliary layer has a plurality of second openings overlapping the part of the plurality of first openings.

3. The fingerprint sensing module according to claim 2, wherein the collimation structure layer comprises a flat layer connected to the auxiliary layer, a part of the plurality of second openings of the auxiliary layer expose a surface of the flat layer, and a part of the plurality of micro lenses directly contact the surface of the flat layer.

4. The fingerprint sensing module according to claim 3, wherein the plurality of micro lenses are made of the same material as the flat layer.

5. The fingerprint sensing module according to claim 2, wherein the interposer is further disposed in the part of the plurality of second openings of the auxiliary layer.

6. The fingerprint sensing module according to claim 2, wherein the auxiliary layer further has a surface exposed by the part of the plurality of first openings, and the interposer covers the surface of the auxiliary layer.

7. The fingerprint sensing module according to claim 1, wherein the interposer covers the surface of the light-shielding layer.

8. The fingerprint sensing module according to claim 7, wherein the plurality of micro lenses partially overlap the surface of the light-shielding layer, and directly contact a part of the interposer covering the surface of the light-shielding layer.

9. The fingerprint sensing module according to claim 1, wherein a material of the interposer comprises molybdenum metal.

10. A fingerprint sensing module, comprising:
    a substrate;
    a plurality of photosensitive devices, disposed on the substrate;
    a collimation structure layer, disposed on the plurality of photosensitive devices;
    a light-shielding layer, disposed on the collimation structure layer, wherein the light-shielding layer has a surface and a plurality of first openings recessed from the surface, the plurality of first openings respectively overlap the plurality of photosensitive devices;
    an interposer, disposed on the collimation structure layer and covering the surface of the light-shielding layer; and
    a plurality of micro lenses, disposed on the interposer and overlapping the plurality of first openings and a part of the interposer.

11. The fingerprint sensing module according to claim 10, wherein the interposer does not overlap the plurality of first openings of the light-shielding layer.

12. The fingerprint sensing module according to claim 10, further comprising:
    an auxiliary layer, disposed between the light-shielding layer and the collimation structure layer, wherein the auxiliary layer has a plurality of second openings overlapping the plurality of first openings.

13. The fingerprint sensing module according to claim 12, wherein the collimation structure layer comprises a flat layer connected to the auxiliary layer, the plurality of second openings of the auxiliary layer expose a surface of the flat layer, and the plurality of micro lenses directly contact the surface of the flat layer.

14. The fingerprint sensing module according to claim 13, wherein the plurality of micro lenses are made of the same material as the flat layer.

15. The fingerprint sensing module according to claim 12, wherein the interposer has a plurality of third openings overlapping the plurality of first openings, and the plurality of first openings of the light-shielding layer, the plurality of second openings of the auxiliary layer, and the plurality of third openings of the interposer are aligned with each other.

16. The fingerprint sensing module according to claim 12, wherein a material of the auxiliary layer comprises silicon nitride, and a material of the plurality of micro lenses comprises an organic photoresist material.

17. The fingerprint sensing module according to claim 10, wherein a material of the light-shielding layer comprises molybdenum metal.

* * * * *